June 14, 1960 J. R. SCANTLIN 2,941,161

BROADCAST PAGING SYSTEM

Filed May 26, 1954 2 Sheets-Sheet 1

INVENTOR.
JOHN R. SCANTLIN
BY HIS ATTORNEYS.
HARRIS, KIECH, FOSTER & HARRIS

June 14, 1960 J. R. SCANTLIN 2,941,161

BROADCAST PAGING SYSTEM

Filed May 26, 1954 2 Sheets-Sheet 2

INVENTOR.
JOHN R. SCANTLIN

BY HIS ATTORNEYS.
HARRIS, KIECH, FOSTER & HARRIS

United States Patent Office 2,941,161

Patented June 14, 1960

2,941,161

BROADCAST PAGING SYSTEM

John R. Scantlin, West Los Angeles, Calif., assignor to General Dynamics Corporation, a corporation of Delaware Filed May 26, 1954, Ser. No. 432,517

3 Claims. (Cl. 331—149)

This invention relates to a broadcast paging system and particularly to a system in which a single radio transmitting station may selectively call any one or more of a plurality of remotely located radio receiving stations.

In essence, the system is one of communication between a transmitter and a plurality of remote radio receivers. It is particularly adapted to provide a service for use by a class of persons or subscribers whose activities necessitate their movement from place to place. Such subscribers may be doctors, policemen, salesmen or others who are subject to immediate call for performance of services, for emergencies, etc. The service consists of providing each subscriber with a radio receiver which is responsive to a predetermined code signal, the receiver being adapted to provide an audible note or other visual indication to signal to the subscriber that he is being paged. Further, the system may be employed in large industrial plants wherein selected employees who are frequently subject to call are provided with receivers. For industrial applications, transmission may be confined within the plant.

The paging system herein consists of a main transmitting station and a plurality of receivers each tuned to the frequency of the carrier wave transmitted. Each receiver is an exceptionally small unit adapted to be conveniently carried upon the person, the overall dimensions of the case enclosing a self-sufficient receiver of one embodiment of the invention to be herein described approximating 3½" x 2½" x 1".

In one presently existing radio paging system each subscriber is supplied with a conventional radio receiver and is assigned a code number. When it is desired to page one of these subscribers, the personnel operating the transmitter are advised of the name of code number of the subscriber. The code number is added to the list of other code numbers of other subscribers being paged and the transmitter is voice-modulated so as to sequentially broadcast each number. The subscriber, sensing that he is being paged, turns on his receiver and listens to the voice enunciation of the numbers of the subscribers being paged. Upon hearing his own number, he is appraised that he is being paged and thereupon telephones or otherwise communicates with the transmitting station or other assigned office to receive his message. In view of the disclosure to be made herein, it is obvious that a system of the type above described is cumbersome, inefficient and subject to error. Further, it is incapable of handling more than a very limited number of subscribers based upon the probability that a certain percentage of subscribers at peak hours will be on call at the same time. Further, it is obviously impractical to page a large number of subscribers during the same period because of the time wait imposed upon the subscriber in listening for his number. It is an object of the present invention to overcome these disadvantages.

The present invention contemplates a means of transmitting code numbers by an intelligence code, that is, for each number the carrier wave of the transmitter is modulated by a code comprising a plurality of spaced signals which may consist of a series of tones or frequencies transmitted within a predetermined time or time-base. Each receiver is tuned to the carrier and receives the intelligence code. However, only one receiver (or more than one if desired) is adapted to respond to each code number. Hence, a receiver upon receiving the carrier modulated by an intelligence code corresponding to the number to which it is assigned will respond as by registering a sound, emitting a light or otherwise provided a signal that may be sensed by the subscriber. Thus, the subscriber need not speculate that he is being paged and need not expend time-consuming mental or physical effort in periodically listening for his code number, but is assured that he will be apprised when paged. It is to be recognized that in a voice system the subscriber must aurally detect his code number. Obviously this hearing capabilities or the noise-level at his location may present considerable difficulty to him, lending possibilities of misinterpretation and/or error. It is another object of this invention, therefore, to provide a selective response device overcoming such difficulties.

Inasmuch as the intelligence code consists of a plurality of spaced signals, for example, four signals, it will become apparent that each code is capable of being transmitted within a relatively short time-base as compared to the time necessary to voice-enunciate a number, notwithstanding the time interval necessary between numbers. Even if each code occupied as much time as a voice enunciation of a code number, a greater number of subscribers may be accommodated because each subscriber need not listen to the entire series of codes. In this manner it is apparent that a considerably greater number of subscribers may be provided with the service from a single transmitter, which is another object of the present invention.

A further object of the invention is to provide a receiver which will receive a modulated carrier wave and will automatically signal the subscriber upon receiving a code signal corresponding to the code number of the subscriber.

Another object is to provide a receiver of the type described which when placed in operative condition, and which must necessarily be in an "on" condition during use, consumes a relatively small amount of power, which is occasioned by the fact that only a portion of the receiver is functionally operative to receive the transmitted intelligence code, the other portion of the receiver being substantially nonpower consuming pending reception of its code signal which effectively triggers the signaling means into operation.

It is another object to provide a receiver having a self-contained source of power which may be conveniently carried upon the person. It is an additional object to provide such a receiver which utilizes a minimum of stand-by power and which may be triggered by a code signal to provide an audible signal of sufficient intensity to apprise the subscriber of his being paged even if he be up to fifty feet removed from the receiver.

It is a further object to provide a device of the type herein described whereby the subscriber may conveniently ascertain whether or not his personal receiver is functioning and receiving the modulated carrier wave.

Another object is to provide a low power-consuming receiver capable of a high degree of sensitivity and which when carried upon the person is relatively insensitive to capacitive effects necessarily caused by the proximity of the body of the person.

An additional object is to provide a receiver of the type described including a means to convert the receiver so as to reproduce a voice message.

The invention also has for its objects to provide such means that are positive in operation, convenient in use, economical of manufacture, relatively simple, and of general superiority and serviceability.

The invention also comprises novel details of construction and novel combinations and arrangements of parts, which will more fully appear in the course of the following description. However, the drawings merely show and the following description merely describes a preferred embodiment of the present invention including certain modifications, which is given by way of illustration or example only.

In the drawings, like reference characters designate similar parts in the several views, wherein:

Fig. 1 schematically illustrates a transmitter, a modulated carrier wave emanating therefrom, and a plurality of individual receivers each of which is selectively responsive to a predetermined intelligence code;

Figure 1:
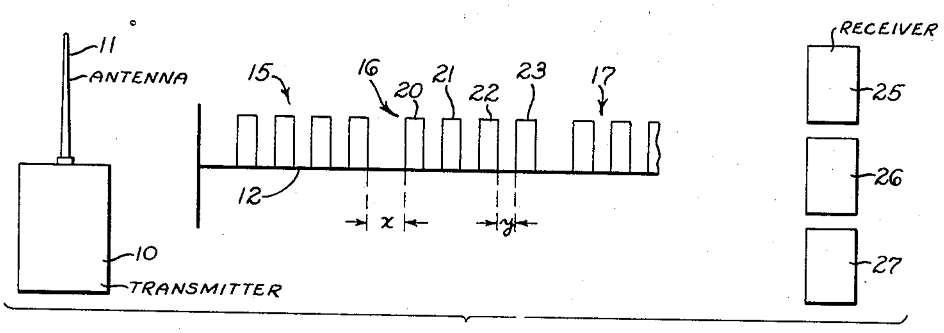

Referring now more particularly to Fig. 1, there is illustrated a transmitter 10 having a usual antenna 11 for radioing into space a carrier wave represented by the line 12. The carrier is modulated in any recognized manner to provide a series of code pulses illustrated by the numerals 15, 16, 17, etc. Preferably, each series 15, 16, 17, etc., is time-spaced apart by a time $x$ which is greater than a time $y$ intermediate the pulses of any series, for example, the pulses of series 16 represented by the numerals 20, 21, 22, 23. In practice, the time $y$ may be reduced to a very low value or may be eliminated as desired. However, it is preferable, although not mandatory, that the time-spacing intermediate the pulses 20–23, inclusive, be of equal duration and that the pulses also be of equal duration. It will also be understood that conventional electronic devices may provide pulse modulation of any series herein represented within a time of one-half second or less. The series of code pulses, which in the description will be limited to four for purposes of illustration only, constitute an intelligence code corresponding to a number assigned to one or more of the subscribers.

In the embodiment herein illustrated, the pulses 20–23, inclusive, comprise modulating frequencies within the audio range. For example, nine tones (i.e., 1—2—3—4—5—6—7—8—9) may comprise the selected complement of tones necessary to accommodate upwards of four thousand subscribers. Exemplary of a complement of tones are the following frequencies in cycles per second: 300, 324 . . . 555, which may be deemed to correspond with the nine tones, 1, 2 . . . 9, each successive tone being spaced upwardly by a differential of eight percent. Thus the series 15 may comprise tone pulses 1—4—7—2, the series 16 may comprise tone pulses 2—5—4—1, etc. It will be understood, therefore, that each subscriber is assigned a code number which corresponds to the series or succession of tones to which his personal receiver is adapted to respond. Thus, the code number for the series 15 is 1472.

Referring again to Fig. 1, there is illustrated a plurality of receivers 25, 26, 27, etc., which are tuned to receive the modulated carrier 12. Assuming that the receiver 25 is adapted, as hereinafter described, to respond to a succession of tone pulses modulating the carrier corresponding to the code number 1—4—7—2, it only will provide an audible response, the other receivers remaining silent.

Figure 2:
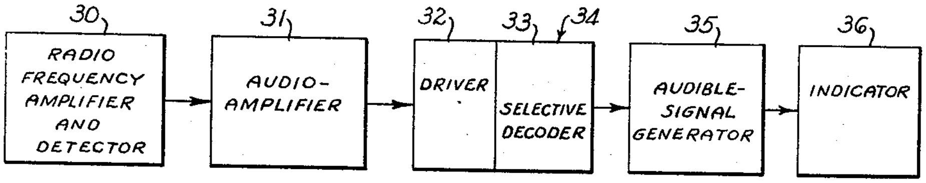
Fig. 2 is a box schematic representation of the internal components of the receivers.

Fig. 2 illustrates in box schematic form the elemental assemblies of each of the receivers 25, 26, 27, etc. Each receiver comprises a radio-frequency amplifier-detector 30, an audio-amplifier 31, a driver 32 and a selective decoder 33 constituting an integrated unit that may be referred to generally as an analyzer 34, an audible-signal generator 35, and an indicator 36.

Figure 3:
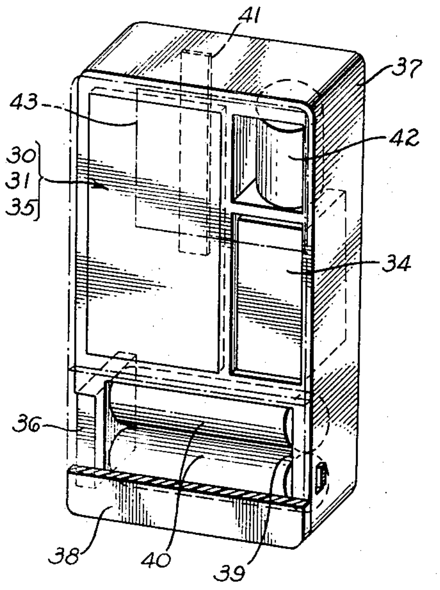
Fig. 3 is a perspective view, partially cut away, of one of the receivers showing the disposition of the various component parts.

Fig. 3 illustrates a partially cutaway perspective view of one of the receivers. Essentially, it consists of a case 37 made of a material which is pervious to electromagnetic waves, and a door 38 providing access to a battery-enclosing chamber 39 adapted to house a battery supply 40. Components corresponding to those illustrated in Fig. 2 are generally indicated in Fig. 3. Included in the amplifier-detector 30 is an antenna 41 and a coil 42, although a physically independent antenna is not mandatory to the proper functioning of the receiver. However, there is a locus of sensitivity in the circuitry which is susceptible to capacitive effects such as body loading due to proximity with the body of a person. Inasmuch as the receiver is to be carried upon the person, a ground plane or shield 43 consisting of impervious metal is disposed relative to the case so as to lie in a plane intermediate the body of the person and the locus of sensitivity when the receiver is carried, for example, in the vest pocket of the subscriber. The shield 43 is preferably connected to the chassis of the receiver or that portion of the receiver corresponding to ground. The antenna 41 may be in the form of a strip as shown and disposed as far as possible from the shield 43. Thus it will be understood that the shield functions as a ground plane for the antenna.

Figure 4:
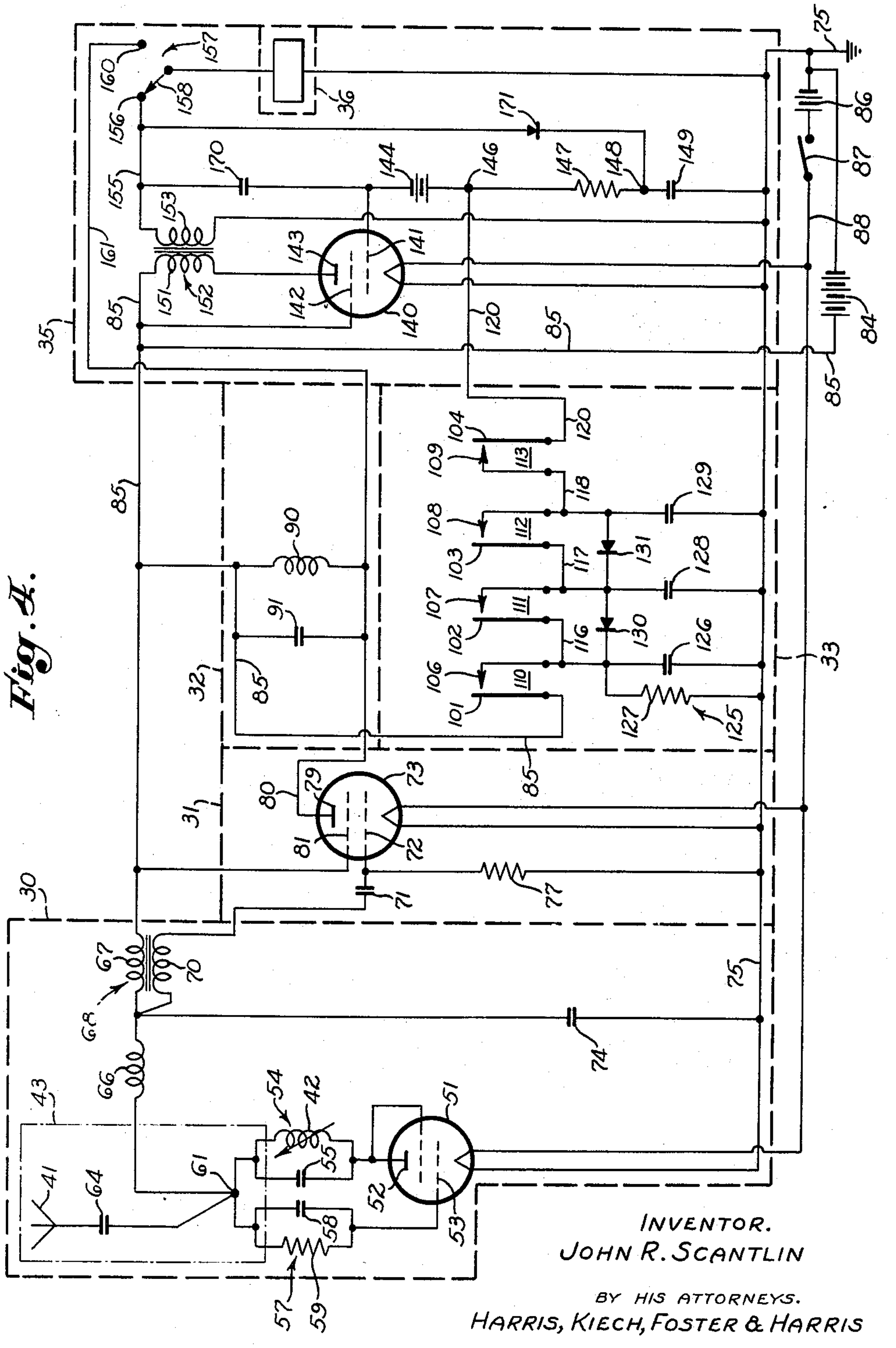
Fig. 4 is a schematic circuit diagram of an embodiment of the present invention.

Referring to Fig. 4 there is illustrated the circuitry of a receiver in schematic representation. The circuits corresponding to the box representation of Fig. 2 are generally indicated by the areas within the dotted enclosures. The amplifier-detector 30 may be the superregenerative type which functions to receive the modulated carrier, detect the tone frequencies for conversion into discrete undulating signals, and amplify the same. The amplifier-detector 30 comprises a tube 51 having an anode 52 and a grid 53. Connected to the anode 52 is one end of a tuned circuit 54 comprising a condenser 55 and the coil 42 connected in parallel. The coil 42 is provided with a tuning means, for example, as by a slug of ferromagnetic material which may be adjusted for movement into and out of the cylinder defined by the coil. Connected to the grid 53 is one end of a circuit 57 constituted by a condenser 58 and a resistor 59 connected in parallel. The other ends of the circuits 54 and 57 are connected in common to a terminal 61. An antenna may be employed such as the antenna 41 hereinbefore referred to which is illustrated as being connected to the terminal 61 through a series-coupling condenser 64. As will be hereinafter understood, power is supplied to the amplifier-detector 30, through the terminal 61, through a choke 66 and the primary winding 67 of a transformer 68.

In the amplifier-detector 30 illustrated, the coil 42 preferably being of a large diameter may constitute an effective loop antenna if it is desired to eliminate the antenna 41. In any event, the carrier wave as modulated is received and the signal applied to the grid 53 of the tube 51. The carrier frequency may be of any value capable of transmission, frequencies of 43.58 and 35.58 megacycles having been ascertained as suitable for the purpose and acceptable by governmental authorities for employment in the operation of a transmitter for systems of this general character. The carrier is preferably modulated at the transmitter by pulses of essentially square-wave tones, the tones being in the audio range as previously described. The terminal 61 of the amplifier-detector 30 is connected to the input of the audio-amplifier 31. In Fig. 4 the connection is constituted by the choke 66, a secondary winding 70 of the transformer 68, and a coupling condenser 71 for ultimate connection to a grid 72 of a tube 73. The connection intermediate the choke 66 and the secondary winding 70 is connected to a by-pass condenser 74 which in turn is communicated to a bus or ground 75. The choke 66 and condenser 74 serve to by-pass the radio-frequency component permitting the tone pulses to be applied to the grid 72 of the tube 73. The grid 72 may be suitably biased to the ground 75 by means of a resistor 77.

The audio-amplifier 31 may comprise any suitable audio-amplification means and in the illustration it is shown as comprising the tube 73 having the grid 72 and an anode 79, the anode being connected to a conductor 80. The conductor 80 in relation to the ground 75 may be deemed the output of the audio-amplifier 31 as well as the output for the combined amplifier-detector 30 and amplifier 31. The tube 73 may also be provided with a screen grid 81 connected to one side of the primary winding 67 of the transformer 68, as shown.

It may now be convenient to refer to the power source for the receiver. A source of energy is provided by a battery 84 having its positive terminal connected to a bus or power line 85 and having its negative terminal connected to the ground 75. A second battery 86 is employed for supplying current to the heaters of the various tubes utilized. One side of the battery 86 is connected to the ground 75 and the other side is connected to a switch 87 and to a line 88 which is connected to the heaters of each tube. The switch 87 may be deemed one form of a master control switch inasmuch as it is connected to open the circuit providing power to the heaters of the tubes. It will be understood that if the heaters are de-energized, plate current will not flow. Effectively therefore there is no drain on the battery 84.

The power line 85 is connected to one side of the primary winding 67 of the transformer 68 to provide the amplifier-detector 30 with a source of energy. It is also connected to one end of a coil or driving means 90 which constitutes a part of the analyzer 34, the coil being connected at its other end to the conductor 80. Thus, the coil 90 constitutes a load impedance for the output of the audio-amplifier 31. It will be understood, therefore, that the amplified tone-frequency pulses provided by the tube 73 will appear across the coil 90. If desired a condenser 91 may be connected across the coil 90 so as to provide a tuned circuit for appropriate peaking of tone frequencies within a selected range.

The coil 90 constitutes a driving means for the selective decoder 33, the coil being electrically integrated with a plurality of vibratile members which may take the form of individual reeds formed so as to be tuned or have a natural period of vibration of a predetermined frequency. Preferably the reeds are composed of magnetic material each being capable of being set into vibration by an alternating magnetic field having a frequency corresponding to the frequency to which the reed is tuned. It is contemplated that the vibratile members may be set into motion by the electromagnetic flux developed by the coil 90 or by any suitable driving means having electromagnetic coupling with the vibratile members.

It will be understood, therefore, that each vibratile member to be described is disposed at least in part within the magnetic circuit path of the coil 90, suitable ferromagnetic material preferably being includable in the magnetic circuit so as to provide a close coupling intermediate the field of the core and the reeds. Referring particularly to the selective decoder 33 illustrated in Fig. 4, there is a plurality of reeds 101, 102, 103 and 104 each having a predetermined natural period of vibration. Four reeds are illustrated commensurate with the four tone pulses described, the number of reeds employed being for illustration only. The structural difference between the respective receivers lies in the frequency response of the respective reeds. Each reed constitutes a conductor and is fabricated to have a natural period of vibration corresponding to one of the nine tone frequencies previously referred to. For example, the reeds 101–104, inclusive, may be tuned to respond to tones 1—4—7—2 corresponding to the code number hereinbefore referred to by way of illustration. Thus an alternating-current frequency of 300 cycles per second will cause the reed 101 to vibrate, and a frequency of 324 cycles per second will cause the reed 104 to vibrate, etc. However, as will be hereinafter understood, the selective decoder will not operatively respond unless the tones applied to the coil 90 arrive in succession in a series code of tones 1—4—7—2.

Each reed has a co-operating contact 106, 107, 108 and 109, respectively, each contact being relatively rigid with respect to the case 37. Each reed and its corresponding contact may be referred to in combination as a circuit-closing element and are identified respectively by the numerals 110, 111, 112 and 113, each reed having a contact portion for engagement with its respective contact and each circuit-closing element being normally open. All of the circuit-closing elements are serially connected as by means of conductors 116, 117 and 118, the reed 101 of the circuit-closing element 110 being connected to the power line 85 and the reed 104 of the circuit-closing element 113 being connected to a conductor 120 which constitutes the output line of the selective decoder 33. Thus the power line 85 or source of energy is connected to one side of the serially-connected circuit-closing elements, the elements functioning together with other circuit elements to be described to transfer a portion of the energy available at the line 85 to the output conductor 120.

Connected to the conductor 116 is a circuit 125 constituted by a condenser 126 and a resistor 127 in parallel relationship each of which is connected to the ground 75. Condensers 128 and 129 are connected respectively to the conductors 117 and 118 and to the ground 75. Connected intermediate the upper end of the circuit 125 and the upper end of the condenser 128 is a unilateral conductor 130 which may take the form of a rectifier. Similarly, a unilateral conductor 131 is connected intermediate the upper ends of the condensers 128 and 129. Each unilateral conductor is polarized as illustrated so as to be capable of conducting toward the circuit 125 and to impede a flow of current in the opposite direction.

The circuit 125 is effectively an energy-storing device. For example, if a direct-current potential is applied across the conductor 116 and the ground 75, the condenser 126 will charge. Upon interruption of the potential the charge of the condenser will be dissipated through the resistor 127 within a predetermined time as a function of the circuit constants.

Employing the code number example 1—4—7—2, and assuming the receiver of Fig. 4 is adapted to respond to such code, the tone pulses, therefore, will appear in succession across the coil 90. The reeds 101–104, inclusive, are adapted to vibrate only when subjected to an alternating magnetic field of a frequency corresponding respectively to the tones 1—4—7—2. Therefore, inasmuch as the reeds are all disposed in the magnetic field created by the energized coil 90, the reeds will vibrate in succession and sequentially thereby closing the circuit-closing elements 110–113 at least for a portion of the time that the reeds are in vibration. It is to be understood, however, that the reed 101 will only vibrate when the tone 1 is applied to the coil 90. Vibration ceases during the time spacing between tones 1 and 4. Thereafter reed 102 will be set into motion, all other reeds remaining substantially motionless and the circuit-closing elements therefor remaining open. In successive order, therefore, the circuit-closing elements are closed and opened.

Upon closure of the circuit-closing element 110 the power line 85 is communicated with the circuit 125 charging the condenser 126. Upon opening of the element 110, within a predetermined time interval the charge on the condenser 126 will be discharged through the resistor 127. However, before appreciable discharge, the circuit-closing element 111 will close thereby connecting the condenser 128 across the condenser 126. Accordingly, the charge on the condenser 126 is shared with the condenser 128. Similarly when the reed 103 is set into motion the closure of the circuit-closing element 112 causes the condenser 129 to share in the charge upon the condenser 128. Lastly, when the circuit-closing element 113 closes due to the last pulse 2, the charge remaining upon the condenser 129 is communicated to the conductor 120. The polarity of the charge is positive in the illustration given and the wave shape appearing on the conductor 120 is of a random nature being a function of the intermittent closure of the circuit-closing element 113 during vibration of its reed and the value of the charge upon the condenser 129. Irrespective of the shape of the wave, an effective positive pulse appears upon the conductor 120 with respect to the ground 75 of sufficient value to trigger the audible-signal generator 35 to be hereinafter described.

It is to be recognized that during the successive transfer of a portion of the energy stored by the circuit 125 the charge upon the condenser 126 is being dissipated through the resistor 127. Inasmuch as the condenser 129 is connected with the resistor 127 through the rectifiers 130 and 131, any charge remaining upon the condenser 129 after opening of the circuit-closing element 112 or 113, as the case may be, is communicated to the resistor 127 and is subject to being dissipated therethrough. Similarly, any charge on the condenser 128 is communicated to the resistor 127 through the rectifier 130. It is to be understood, however, that any positive charge initially appearing across the condenser 126 is without communication to either of the condensers 128 or 139 and esentially so in the event that a code signal is applied to the coil 90 not corresponding to the tones 1–4–7–2. For example, if the first tone of a code is 1, the condenser 126 will become charged. If the second tone is 7, the circuit-closing element 112 will close. Due to the polarization of the unilateral conductor 130 there is an effective open circuit intermediate the condenser 126 and the condenser 128 or 129. Thus the charge upon the condenser 126 is not shared by or transferred to any other condenser.

The constants of the circuit elements above described are selected so that the resistance 127 of the circuit 125 together with the connections to the rectifiers 130 and 131 will effectively dissipate the charge upon all of the condensers within a limited time so that any charge remaining after receiving a particular code signal will be inconsequential during the time that the next subsequent code signal is being received. For example, if a different code comprising a series of tones 1–4–7–8 is received, it will be apparent that the circuit-closing element 113 of the 1472 receiver will not close and the unit will not respond. However, if the next subsequent signal is 2—*x*—*x*—*x*, it is apparent that the circuit-closing element 113 will close. If there is any material charge remaining upon the condenser 129, it will be communicated to the conductor 120 and cause the device to respond, which will be a false response. It is preferable, therefore, that the circuit constants be selected so that the charge is effectively dissipated within the time-base or cycle defined by a code of the shortest duration intended to be employed and thereby precluding the possibility of a false response due to a possible combination of adjacent code signals. Thus, each receiver is inherently reset before receipt of the next subsequent series of tones.

The combination of elements connected to the circuit-closing elements, as shown, is arranged so that the condensers 128 and 129 may never be more positively charged than the condenser 126, and the condenser 129 may never be more positively charged than the condenser 128. Effectively, therefore, the condensers 129, 128 and 126 are integrated and co-operate together and the resistor 127 controls the discharge thereof. It has been proposed that the unilateral conductors 130 and 131 may be eliminated and an individual resistor bridged across each of the condensers 128 and 129. Such would provide individual storage circuits for each of the circuit-closing elements to which they are connected, each operating as a function of the characteristics of its circuit elements. Although such construction is capable of communicating a portion of the energy from the line 85 to the conductor 120, the absence of integration between the circuits of the various circuit-closing elements may not assure a coordinated dissipation of the charges that may be upon the condensers within the time limited thereby rendering the device subject to false response.

Referring to the tones which comprise the code signal, the sequential function of the decoder dictates that for selective calling of individual subscribers the adjacent reeds of the decoders be responsive to different frequencies, although two like reeds may appear in the same series combination. For example, a hypothetical receiver having reeds of tone-response frequencies 1—1—4—7 would respond to a tone series 1—4—7—2, both first and second reeds vibrating simultaneously to cause an initial charge to be applied to both condensers 126 and 128. The next tones 4 and 7 would cause the hypothetical receiver to respond, the last tone 2 causing the 1472 receiver to respond. For individual selectivity, therefore, adjacent reeds must be tuned to different frequencies. However, if group selectivity is desired, that is, simultaneous paging of a particular class or group of subscribers, it is contemplated that the personal receivers may be adapted to respond to a code signal of the hypothetical nature described.

Referring now to the signal generator 35, it includes a normally inoperative oscillator tube 140 having a grid 141, a screen grid 142 and an anode 143. The grid 141 is connnected to the negative side of a battery 144, the positive side being connected to a terminal 146 and to the conductor 120. The terminal 146 is also connected to a grid resistor 147 and to a terminal 148. A condenser 149 is connected intermediate the terminal 148 and the ground 75. The anode 143 is connected to a primary winding 151 of a transformer 152 and thence to the power line 85. The screen grid 142 may be conveniently connected as shown to the power line 85. A secondary winding 153 of the transformer 152 has one terminal connected to the ground 75, the other terminal being communicated to a conductor 155 and to one pole 156 of a double-pole single-throw switch 157. A switch arm 158 of the switch has connected thereto the indicator 36 which in turn is connected to the ground 75. The other pole of the switch identified by the numeral 160 is communicated by a conductor 161 to the conductor 80 of the amplifier 31. It will be understood that if the switch 157 is disposed so that the indicator 36 is connected in the output of the tube 73, and if the indicator is constituted by a speaker, the tone frequencies received may be audibly reproduced. However, if the carrier wave is voice modulated, it will be apparent that the indicator will respond to reproduce the voice. In the embodiment illustrated the indicator 36 may take the form of a crystal speaker such as is presently employed in hearing-aid devices.

Completing the oscillatory circuit, a condenser 170 is connected intermediate the conductor 155 and the grid 141 of the tube. Completing the load circuit, a unilateral conductor or rectifier or diode 171 is connected intermediate the conductor 155 and the terminal 148.

The tube 140 is a normally inoperative oscillator, being normally biased to cut-off by means of the negative potential of the battery 144. In the quiescent condition the terminal 146 is at ground potential in accordance with the following connection: the ground 75 via the secondary winding 153 of the transformer, via the conductor 155, via the unilateral conductor 171 which is polarized as illustrated, to the terminal 148, and via the resistor 147 to the terminal 146. Thus the battery 144 which in the embodiment illustrated may provide voltage of three volts is sufficient to bias the tube to cut-off.

The impedance of the primary winding 151 of the transformer 152 together with the reflected impedance constituted by the circuit connected to the secondary winding 153 provides a load for the tube 140. The transformer 152 constitutes a coupling means rendering the secondary winding 153 in the nature of a signal generator.

When a positive pulse appears at the conductor 120 and across the resistor 147 the terminal 146 is driven in a positive direction. The pulse opposes the voltage of the battery 144 and is sufficient to cause a flow of plate current in the tube 140, such current developing a voltage across the primary winding 151 of the transformer 152. Amplification is provided by the tube 140, and the transformer may be of the step-up type. In any event a voltage appears at the conductor 155 which is applied to the condenser 170, which in turn is connected to the grid 141 and causes the tube to oscillate, the frequency thereof being preferably in the range of 1000 cycles per second.

The secondary winding 153 is thus an alternating-current generator or source having the indicator 36 connected thereacross. Accordingly, the indicator in the form of a speaker will emit a distinctly audible tone in the range of 1000 cycles per second which is clearly audible to the subscriber as well as others within the immediate vicinity. Of course, a visual or tactile indicator is contemplated as a substitute for a speaker. The employment of a speaker, however, provides a means for announcing to the subscriber that he is being paged and in addition provides a voice reproducer. If, for example, the transmission is within a plant and consists of an intelligence code immediately followed by a voice message, the employee upon hearing the tone signal need merely actuate the switch 157 and receive the voice message.

In the absence of a means to maintain the tube in oscillation the response would be momentary and perhaps not even audible. Accordingly a means for maintaining the tube in oscillation is provided by a dynamic biasing means receiving energy from the transformer 152 to sustain the tube in oscillation until the power source or heater supply for the tubes is interrupted. It is to be noted that in the absence of the mentioned dynamic biasing means the tube 140 may oscillate momentarily but would not fire into a saturated condition of oscillation.

Referring to the positive pulse appearing at the conductor 120 which is applied to the grid 141, it is instantly amplified and in this form appears across the secondary winding 153. The dynamic biasing means is arranged so that positive feedback obtains. Thus the positive pulse appearing at the winding 153 is conducted through the diode 171 and charges the condenser 149. The terminal 148 thereupon assumes a potential above ground of a value sufficient to overcome the fixed bias of the battery 144 thereby urging the grid 141 in a positive direction. This positive feedback is regenerative in nature and permits greater flow of plate current. Thus the tube 140 is driven into saturable oscillation.

It will now become apparent that on each oscillatory swing the positive cycle will be conducted through the diode 171 so as to maintain the charge on the condenser 149. This sustains the tube in oscillation irrespective of any potential that thereafter may be applied through the decoder 33 to the conductor 120. On the negative half of the cycles the back resistance of the diode 171 substantially blocks a rapid discharging of the condenser 149, and the frequency of oscillation is sufficient to maintain an average voltage across the condenser 149 to maintain the grid 141 relatively positive. Effectively, therefore, the winding 153 constitutes a part of the circuit of the dynamic biasing means as well as a signal generator or signal means for actuation of the indicator 36. Further, the diode or unilateral conductor 171 constitutes a part of the biasing means, the combined diode 171 and winding 153 having bridged thereacross the condenser 149 which accumulates a charge to sustain the tube in oscillation.

Inasmuch as the audible-signal generator 35 is self-sustaining after it has been triggered into operation, the indicator 36 will continue to emit an audible frequency until the oscillation is interrupted. This may be conveniently accomplished by opening the switch 87 to remove the voltage across the heater cathodes of the tubes whereby the unit 35 is automatically reset. That is, when the switch 87 is subsequently closed the tube is again biased to cut-off by the battery 144 and the receipt of a new pulse at the conductor 120 is necessary to trigger the tube into oscillation. When the switch 87 is opened in order to reset the device, the charge on the condenser 149 must be dissipated within a predetermined time. In a preferable construction the diode 171 may have a back resistance of a value not adversely affecting the means for sustaining the tube in oscillation but sufficient to provide a discharge path for the condenser 149 when the filament current is interrupted. It is also possible to provide a discharge path by shunting a suitable resistance across the condenser 149.

In an exemplary embodiment of the present invention the resistor 147 is of a relatively large value. The condenser 170 is selected for a frequency of oscillation on the order of 1000 cycles per second as hereinbefore referred to. The power source 84 may be on the order of 22½ volts which, upon closure of the circuit-closing element 110, will charge the condenser 126 accordingly. If the series of tones received corresponds to the reeds of the particular unit, on the order of two volts will appear at the conductor 120 which is sufficient to pulse-trigger the tube 140 into oscillation.

It will now be readily apparent that the selective response device herein described consumes a relatively small amount of stand-by power inasmuch as the audible-signal generator 35 is normally inoperative. Due to the employment of the reeds a relatively small amount of plate current in the tube 73 is necessary. Further, the radio frequency-detector stage 30 inherently consumes very little power.

The radio frequency-detector being a low-power stage, it is susceptible to capacitive effects of the body of a person and other tangible elements, as hereinbefore referred to. Thus the shield 43 illustrated in Fig. 3 may assume a planar coverage as indicated by the dotted area identified by the numeral 43 on Fig. 4.

When the receiver is functioning to receive the transmitted signals, from time to time at least one or more of the reeds 101–104, inclusive, will vibrate due to the code pulses of other signal series. By placing the receiver close to the ear the reed vibration or tinkle may be heard. Thus the subscriber is able to ascertain that his personal receiver is in actual operation and receiving the transmitted signals.

It is to be understood that the tubes herein referred to are merely illustrations of electronic valve means and that it is contemplated that transistors or other equivalent means may be employed. Thus the recitation of a tube and its associated elements in the appended claims is deemed to embrace a transistor and its associated elements.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

I claim as my invention:

1. In a response system having means for providing a response pulse, the combination of a tube having a control electrode, an output electrode and a cathode, a load connected to said tube output electrode, means for applying an oscillation-producing feedback potential coupled between said load and control electrode, a source of oscillation-opposing bias connected to said control electrode, a resistor having one end connected to said source of oscillation-opposing bias, a capacitor connected between the other end of said resistor and said cathode, means to apply said response pulse between said bias means and resistor in opposition to said bias means to cause said tube to oscillate in response thereto, and means to charge said capacitor from said load when said tube oscillates with a potential having an amplitude and polarity to overcome said source of oscillation-opposing bias and maintain said tube oscillatory.

2. In a response system as recited in claim 1 wherein said means to charge said capacitor from said load when said tube oscillates with a potential having an amplitude and polarity to overcome said source of oscillation-opposing bias and maintain said tube oscillatory includes a unilateral conductor connected between said load and said capacitor.

3. In a response system the combination of a tube having a control grid, anode and cathode, a load transformer having a primary winding connected to said anode and a secondary winding, one end of said secondary winding being connected to said cathode, a feedback capacitor connected between the other end of said secondary winding and said control grid, a source of oscillation-opposing bias, a resistor and a bias capacitor, said bias capacitor being connected between said cathode and one end of said resistor, said source of oscillation-opposing bias being connected between the other end of said resistor and said control grid, a rectifier connected between said other end of said secondary winding and said one end of said resistor, and means for applying a pulse for initiating sustained oscillations to the junction of said resistor and said source of oscillation-opposing bias.

References Cited in the file of this patent

UNITED STATES PATENTS

| | | |
|---|---|---|
| 1,621,034 | Slepian | Mar. 15, 1927 |
| 2,255,162 | Hart | Sept. 9, 1941 |
| 2,255,897 | Rebori et al. | Sept. 16, 1941 |
| 2,281,709 | Olson | May 5, 1942 |
| 2,361,953 | McDonald | Nov. 7, 1944 |
| 2,489,202 | Selinger | Nov. 22, 1949 |
| 2,494,451 | Olson | Jan. 10, 1950 |
| 2,524,782 | Ferrar | Oct. 10, 1950 |
| 2,547,025 | Noble | Apr. 3, 1951 |
| 2,548,953 | Crown et al. | Apr. 17, 1951 |
| 2,556,027 | Carson | June 5, 1951 |
| 2,606,216 | Frommer | Aug. 5, 1952 |
| 2,626,384 | Winkler | Jan. 20, 1953 |
| 2,630,482 | Bostwick | Mar. 3, 1953 |
| 2,643,369 | Manley | June 23, 1953 |
| 2,676,251 | Scarbrough | Apr. 20, 1954 |
| 2,736,806 | Miller | Feb. 28, 1956 |

OTHER REFERENCES

A publication entitled, "Vibrating Reed Selective Signalling System for Mobile Telephone Use," AIEE Technical Paper, 49–100, December 1948 (pages 9–12 and Fig. 4).